United States Patent

Jansen, Jr.

[15] 3,656,116

[45] Apr. 11, 1972

[54] COMPUTER INTERFACE

[72] Inventor: James M. Jansen, Jr., Oak Ridge, Tenn.

[73] Assignee: The United States of America as represented by the United States Atomic Energy Commission

[22] Filed: May 5, 1970

[21] Appl. No.: 34,783

[52] U.S. Cl. ....................340/172.5, 250/218, 340/347 AD

[51] Int. Cl. ....................................G06f 3/05, G05b 21/00

[58] Field of Search ..................340/172.5, 347 AD, 15.5 A; 250/214, 218, 219 QA; 328/135; 307/229

[56] References Cited

UNITED STATES PATENTS

| | | | |
|---|---|---|---|
| 3,316,539 | 4/1967 | Carleton | 340/172.5 |
| 3,576,441 | 4/1971 | Adams et al. | 250/218 |
| 3,514,613 | 5/1970 | Mashburn | 250/218 |
| 3,449,725 | 6/1969 | Eckelkamp et al. | 340/172.5 |
| 3,116,458 | 12/1963 | Margopoulos | 328/135 |
| 3,555,284 | 1/1971 | Anderson | 250/218 |
| 3,471,853 | 10/1969 | Brooks et al. | 340/347 |
| 3,412,241 | 11/1968 | Spence et al. | 235/183 |
| 3,308,438 | 3/1967 | Spergel et al. | 340/172.5 |
| 3,209,320 | 9/1965 | Earthman | 340/15.5 |
| 3,483,512 | 12/1969 | Atkins | 340/146.3 |
| 3,351,911 | 11/1967 | Harple et al. | 340/172.5 |
| 3,304,497 | 2/1967 | MacRitchie et al. | 324/120 |

OTHER PUBLICATIONS

Analog-to-Digital/Digital-to-Analog Conversion Techniques, Hoeschele, David F., Wiley & Sons, Inc. 1967, pp. 347- 353.

*Primary Examiner*—Paul J. Henon
*Assistant Examiner*—Jan E. Rhoads
*Attorney*—Roland A. Anderson

[57] ABSTRACT

An improved interfacing system has been provided for processing data values in the form of rapidly occurring analog pulses from an analytical photometer into a digital computer. The interface comprises an electrical circuit having a data sample-and-hold section that provides data values to an analog-to-digital converter for reading into the computer. A gating circuit is provided which, when enabled by the computer, allows the computer to sense the first of a series of data pulses to provide an address signal into the computer for addressing the following series of pulses in the computer memory taken from the analog-to-digital converter. The computer may communicate with several interfaced photometers by means of programs held in storage whereby the data values are automatically processed according to the analyses being performed by the photometers.

2 Claims, 2 Drawing Figures

INVENTOR.
James M. Jansen, Jr.
BY
Konrad A. Andersen
ATTORNEY

INVENTOR.
James M. Jansen, Jr.
BY
ATTORNEY.

COMPUTER INTERFACE

BACKGROUND OF THE INVENTION

The invention described herein relates generally to interfacing circuitry for identifying and digitalizing analog data signals and more specifically to an interfacing system for the sequential application of rapidly occurring analog data signals into a digital computer upon command from said computer whereby a number of similar data inputs may be interfaced to a single computer. The present invention was made in the course of, or under, a contract with the United States Atomic Energy Commission.

In the art of photometric analysis, various machines have been developed which have been termed high-speed, parallel analyzers for clinical analysis of chemical reactions such as the determination of total protein in blood serum. In these machines, a plurality of discrete samples in individual glass or plastic cuvettes are moved past stations where additions, reactions, or measurements occur. Typically, the cuvettes are formed in a rotating assembly having a plurality of stations around the circumference designed to hold reagents, catalysts, standards, or samples under test. As the assembly is accelerated, all samples and reagents are mixed simultaneously in the cuvettes. The light transmission of the mixtures is then measured by passing light through the cuvettes and detecting the transmitted light using a photomultiplier tube.

Initially, the output of the photomultiplier tube was displayed on an oscilloscope as a pulse, one for each cuvette and photographs were made of the oscilloscope display at various time intervals of interest. The operator would then convert the optical transmitted data to absorbance values, plot the results and compute the concentrations of constituents in the samples. An example of this system may be had by referring to copending U.S. application, Ser. No. 784,739, filed Dec. 18, 1968, now U.S. Pat. No. 3,555,284 issued Jan. 12, 1971 and having a common assignee with the present application.

More recently, a small computer was applied through a special interface to a photometric analyzer of the spinning rotor type. This system allowed direct read-in of sample data to a digital computer and the computer was programmed to perform the various necessary computations. An example of this system may be had by referring to U.S. Pat. No. 3,576,441, issued Apr. 27, 1971, entitled "Analytical Photometer-to-Digital Computer Interfacing System for Real Time Data Reduction," by Raymond K. Adams and John T. Hutton, AEC case No. S-37,996, and having a common assignee with the present invention. This system provided synchronizing pulses for triggering a sample and hold circuit connected to receive the corresponding transmission signal, which was held until read into the computer by means of delay circuits. In this system it is required that the computer time be assigned to the particular analyzer at all times.

The present interface is the result of efforts to provide an automatic system for handling the data from a number of multistation photometric analyzers. For example, installations have been proposed that will have a number of multistation analyzers and it is desired to use one computer with the various interfaced photometers. It is desired in such applications to provide several programs in storage that may be retrieved and executed successively. In order for the computer to receive the data values while at the same time providing maximum flexibility for the attendant softwave, there was a need for an interface which will allow automatic computer control of the acceptance of data signals at preselected intervals according to the program stored in the computer.

SUMMARY OF THE INVENTION

It is an object of this invention to provide an interfacing system for the direct application and address of rapidly occurring analog data signals into a digital computer at selected intervals upon command from the computer.

Briefly, the present invention resides in a system for application of analog data signals to the data storage input of a digital computer, having at least a digital data receiving input, an address input and a data read command output wherein an interfacing system for rapid sequential application of said analog data signals to said computer, comprises: means for generating an address signal just prior to the application of a first of said data signals and subsequently generating an address pulse following each of said data signals in sequence connected to the address input of said computer; a peak follower and holder circuit having an input connected to receive said analog data signals, a reset input and an output circuit for holding the peak level of said analog signal until reset by a reset pulse applied to the reset input thereof; an analog-to-digital converter connected to the output of said peak follower and holder circuit, said analog-to-digital converter having an output connected to said data receiving input of said computer, convert command inputs connected to said address signal generating means for actuating said converter upon the generation of each address signal and a conversion completed output for supplying an output signal upon the completion of the conversion of each analog signal, and means for connecting said conversion completed output of said converter to said reset input of said peak follower and holder circuit and a signaling input of said computer whereby the data signals are stored in said computer upon completion of the conversion of each of said analog data signals in sequential order and the peak follower and holder is reset after the conversion of its output is completed.

Other objects and many of the attendant advantages of the present invention will be obvious from the following detailed description of the invention taken in conjunction with the drawings.

DESCRIPTION OF THE PREFERRED EMBODIMENT

Figure 1:
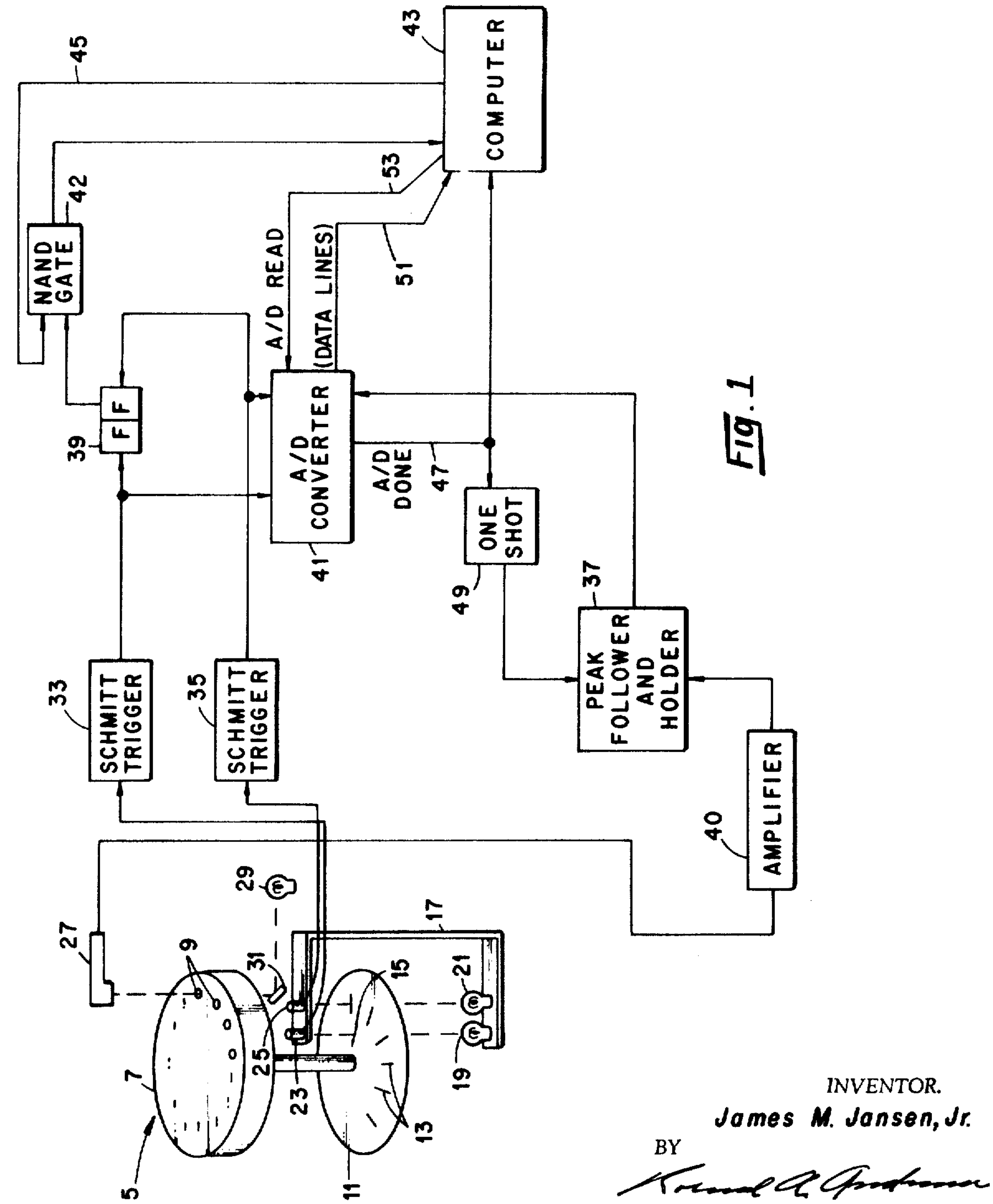
FIG. 1 is a block diagram of an interfacing system according to the present invention.

Referring now to FIG. 1, a portion of the photometric analyzer, as described in the above-referenced U.S. Pat. No. 3,555,284, is shown schematically and generally indicated by reference number 5. The analyzer rotor 7 is power driven by means, now shown, in a conventional manner. Disposed within the rotor 7 are a plurality of sample containing cuvette chambers, one below each of the light-path defining holes 9. The analyzer rotor 7 has attached thereto, for synchronous rotation therewith, a synchronization disc 11. The disc 11 has a plurality of slotted openings 13 radially positioned adjacent the periphery of the disc 11. Each slot 13 is in a particular alignment with a corresponding one of the plurality of cuvette chambers so as to provide a trigger pulse, here termed the cuvette pulse, subsequent to the passing of a cuvette past a sensor position. The disc 11 is also provided with an additional slot 15 which is aligned with rotor 11 at a radial position inward of the slots 13 so as to provide an additional trigger pulse, here termed the rotor pulse, as the rotor spins. This slot is aligned so that the rotor pulse occurs slightly before the illumination of cuvette No. 1, thereby providing the first trigger pulse.

A yoke 17 encompassing the edge of disc 11 carries a pair of light sources 19, 21 on the lower arm of yoke 17 extending beneath the disc 11 and a pair of photodetectors 23, 25 on the upper arm of yoke 17 extending over disc 11. The light source 19 and the detector 23 are aligned so as to provide an output pulse at the detector 29 output (rotor pulse) each time the slot 15 passes between. The light source 21 and the detector 25 are aligned so as to provide an output pulse at the detector 25 output (cuvette pulse) each time a slot 13 passes therebetween. A third photodetector 27 is disposed above the rotor 5 and aligned to sense light transmitted through the cuvettes during rotation from a photometric light source 29 and a mirror 31 disposed below the rotor assembly and oriented to reflect the light beam upward, substantially normal to the plane of rotation of the rotor. The photodetector 27 comprises a photomultiplier tube disposed directly above the cuvette circle to receive all light transmitted upwardly through the axially aligned openings 9.

The timing of the transmission signals is adjustable relative to the trigger pulses by means of positioning the yoke 17 and is made such that the first transmission signal occurs following the rotor pulse and before the first cuvette pulse.

The electronic components shown in block diagram form in FIG. 1 are of standard components design which are all well known and, therefore, need not be discussed in detail here except for their novel combination described herein in order to completely describe the invention. As shown in FIG. 1, connections are such that the rotor pulse is applied to a Schmitt trigger circuit 33, the cuvette pulses to a Schmitt trigger circuit 35, and the transmission signals to a peak follower and holder circuit 37 through an amplifier 40. The output of trigger circuit 33 is connected jointly to the reset input of a flip-flop circuit 39 and to a control input of an analog-to-digital converter 41. The output of trigger circuit 35 is connected jointly to the set input of flip-flop 39 and to another control input of A/D converter 41. A NAND gate 42 that has its output connected to a logic sensing circuit (not shown) in a digital computer 43 is connected at one input to receive a logic level 0 or 1 state from computer 43 via command line 45 and at the other input, the set output of flip-flop 39.

The output of the peak follower and holder circuit 37 is connected to the signal input of A/D converter 41. At the completion of every A/D conversion by converter 41, a logic signal results on output line 47. This logic signal is presented jointly to a delay circuit consisting of a one-shot multivibrator 49 and to a sensing circuit (not shown) at the computer 43. The output of delay 49 is connected to the reset input (R) of the peak follower and holder circuit 37. The A/D converter 41 is conventionally connected to digital computer 43 by means of data lines 51 to provide the digitized transmission signals to the computer upon actuation of a read command on line 53 from the computer.

The A/D converter 41 may be a portion of the input interface of a conventional digital computer which has a plurality of isolated command inputs for triggering the conversion of an analog value presented to the input thereof. The converted signal is held in digital form in the output register until it is read into the computer. Once the output scaler is loaded, the conversion completed output line is energized.

Figure 2:
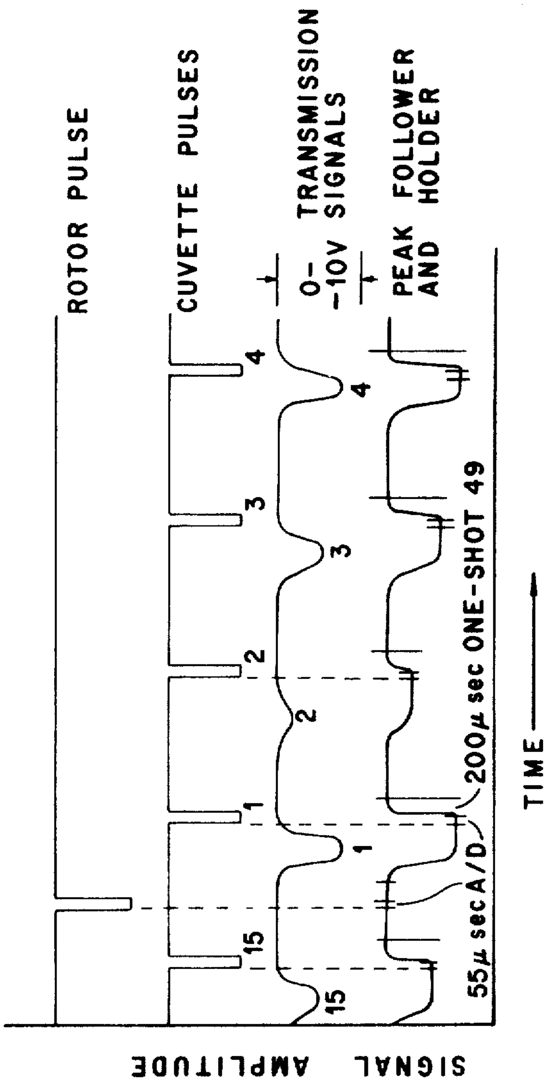
FIG. 2 is a graphic diagram of the preferred timing sequence of the pulses at various points in the diagram of FIG. 1.

The operation of the circuit may be best understood by referring to the timing diagram shown in FIG. 2 wherein there is shown pulses from a 15 station photoanalyzer. As shown, the cuvette pulses are shaped by Schmitt trigger circuit 35 into short duration, fixed amplitude square wave pulses. These pulses cause the output of flip-flop 39 to be in the logic 1 state, i.e., remains set applying a 1 to the input of NAND gate 42. Once during each rotation of the analyzer rotor, a rotor pulse is generated. It is shaped by Schmitt trigger circuit 33 into a similar square wave pulse that causes flip-flop 39 to briefly produce the logic O state at its output. The state of the flip-flop 39 then indicates which of the two signals — cuvette or rotor — occurred last. Computer 43 senses, via the output of the NAND gate 42, this state.

The command to begin taking data may be given from an external action at the computer keyboard. When it occurs, the computer 43 begins to successively test the output of gate 42. This succession of comparison is executed in the computer with a frequency that is fast with respect to the duration of the rotor pulse and the cuvette pulses. Since in this development it is desired to take the date coincident with the leading edge of the timing pulses, the computer is programmed to begin taking in data values only when the leading edge of the rotor pulse occurs and then continues taking in data values as the leading edges of the cuvette pulses occur.

Independently of the action occurring in flip-flop 39, the rotor pulse and cuvette pulses are providing signals to the A/D converter 41 command inputs for converting to digital form the corresponding data values held in the peak follower and holder circuit 37 at those times. For example, at the occurrence of the rotor pulse, the A/D converter 41 is commanded to digitize the present value of the peak analog signal. At the completion of each conversion process, the A/D converter informs the computer of the fact by activating the conversion completed line 47 (a change in logic level). The computer then issues the A/D "READ" command on line 53 to obtain the digitized value of the analog signal, which for the rotor pulse would be the dark current. At the same instant that the computer is informed of the completion of the conversion, the peak follower and holder 37 is reset by means of the conversion completed signal to the one-shot 49. When the one-shot is timed-out, the peak follower and holder 37 is receptive to the next data value which would be the first cuvette pulse. A typical conversion time for the A/D converter 41 is about 55 $\mu$sec and 200 $\mu$sec is sufficient for the one-shot 49 to discharge the value held in the peak holder 37, as shown in FIG. 2.

The sequence continues until all cuvette transmission signals have been read into the computer and the NAND gate 42 output then changes state as the rotor pulse comes up once more. This change of logic level permits the computer to sample the cuvettes again or not as programmed. Normally, the computer program causes each cuvette to be read a number of times and then, when computer time is available, will execute associated data reduction calculations and provide the cuvette values to a storage display unit (not shown).

Obviously many modifications and variations of the invention, as set forth herein, may be made without departing from the spirit and scope of the invention as set forth in the appended claims. For example, the computer program may be altered in such a manner that data signals may be accepted beginning at any point on the rotor prior to being activated by the occurrence of a rotor pulse and when the rotor pulse is sensed the stored data is then addressed.

What is claimed is:

1. In a photometric solution analyzer for measuring the transmission of light through a plurality of discrete samples disposed in a spinning rotor and oriented in a circular array about the center of rotation of said rotor wherein a light sensor is positioned to sense the light transmission through said samples and generate analog data pulses at an output thereof having an amplitude proportional to the light transmission through said samples as the samples are rotated past the sensor position, a computer interfacing system for real time application of said analog data pulses from said sensor sequentially into a digital computer upon command from a read command output of said computer comprising:

means for generating a sync pulse at the output thereof just prior to the passing of a first one of said samples past said sensor position;

means for generating trigger pulses at the output subsequent to the passing of each of said samples past said sensor position;

a first trigger circuit connected to receive said sync pulse and generating a first command pulse at the output thereof in response to the application of said sync pulse at the input thereof;

a second trigger circuit connected to receive said trigger pulses and generating further command pulses at the output thereof in response to the application of said trigger pulses to the input thereof;

a peak follower and holder circuit having a data signal receiving input, a reset input and an output, said data receiving input connected to the output of said light sensor;

an analog-to-digital converter having an analog signal input, first and second convert command inputs, a read command input, a digital signal output, and a conversion completed signal output, said analog signal input of said converter connected to the output of said peak follower and holder circuit, said first convert command input connected to the output of said first trigger circuit, said second convert command input connected to the output of said second trigger circuit, said read command input connected to said read command output of said computer, said digital signal output connected to the input of said computer and said conversion completed signal output connected to a command input of said computer for signaling said computer upon the completion of conversion of each analog signal presented to said converter;

circuit means connected between said conversion completed output of said converter and said reset input of said peak follower and holder for resetting said peak follower and holder following each conversion completed signal from said converter; and gating means having an output connected to a logic sensing input of said computer and first and second inputs connected to the output of said first and second trigger circuits, respectively, for signaling said computer upon the reception of said first command pulse thereby addressing the digital data signals as to the first one of said data signals sequentially stored in said computer.

2. An interfacing system as set forth in claim 1 wherein said gating means includes a flip-flop having a set and reset input and an output actuated when said flip-flop is in the set state, said reset input being connected to the output of said first trigger circuit and said set input being connected to the output of said second trigger circuit, and a NAND gate having a first and second input and an output, said first input being connected to the output of said flip-flop and said output being connected to said logic sensing input of said computer, said computer having an enabling command output connected to said second input of said NAND gate, whereby command to begin taking data enables said gate to pass a pulse to said logic sensing input of said computer responsive to the generation of said first trigger pulse.

* * * * *